US012118873B1

(12) United States Patent
Springer

(10) Patent No.: US 12,118,873 B1
(45) Date of Patent: Oct. 15, 2024

(54) PERSONAL SECURITY ALARM SYSTEM

(71) Applicant: Peter Kingsley Springer, Ponce Inlet, FL (US)

(72) Inventor: Peter Kingsley Springer, Ponce Inlet, FL (US)

( * ) Notice: Subject to any disclaimer, the term of this patent is extended or adjusted under 35 U.S.C. 154(b) by 0 days.

(21) Appl. No.: 18/409,569

(22) Filed: Jan. 10, 2024

(51) Int. Cl.
*G08B 25/01* (2006.01)
*G08B 21/02* (2006.01)
*G08B 25/10* (2006.01)

(52) U.S. Cl.
CPC ........... *G08B 25/016* (2013.01); *G08B 21/02* (2013.01); *G08B 25/10* (2013.01)

(58) Field of Classification Search
None
See application file for complete search history.

(56) References Cited

U.S. PATENT DOCUMENTS

| | | | | |
|---|---|---|---|---|
| 9,342,971 B2 | | 5/2016 | Riley et al. | |
| 10,197,417 B2 | | 2/2019 | Logan et al. | |
| 2005/0275542 A1* | | 12/2005 | Weekes | G08B 25/001 340/571 |
| 2006/0006998 A1* | | 1/2006 | Carlson | G08B 21/0211 455/404.1 |
| 2008/0120392 A1* | | 5/2008 | Dillon | B60Q 1/50 709/208 |
| 2011/0090082 A1* | | 4/2011 | Boston | G08B 25/016 340/539.13 |
| 2014/0340218 A1* | | 11/2014 | Sutherland | G08B 29/188 340/539.12 |
| 2017/0092098 A1 | | 3/2017 | Alampallam et al. | |
| 2021/0099852 A1* | | 4/2021 | Batra | H04W 4/029 |
| 2022/0148414 A1* | | 5/2022 | Mruk | H04W 4/90 |
| 2022/0309893 A1* | | 9/2022 | Terry | G08B 5/38 |
| 2023/0302668 A1* | | 9/2023 | Levine | B26B 1/08 |

FOREIGN PATENT DOCUMENTS

| | | |
|---|---|---|
| CA | 2343707 | 11/2001 |
| CN | 200938849 | 8/2007 |
| CN | 104382240 | 3/2015 |
| DE | 2411046 | 9/1975 |
| DE | 202021101276 | 7/2022 |
| IN | 201911014002 | 5/2019 |
| IN | 201821015590 | 11/2019 |
| KR | 20010019493 | 3/2001 |
| KR | 200448364 | 4/2010 |
| KR | 200456755 | 11/2011 |
| WO | 2018041292 | 3/2018 |
| WO | 2019219192 | 11/2019 |

* cited by examiner

*Primary Examiner* — Adolf Dsouza
(74) *Attorney, Agent, or Firm* — The Concept Law Group, PA; Scott D. Smiley; Scott M. Garrett

(57) ABSTRACT

A personal security alarm system includes a device that is worn by a person that senses contact with the person. The device is configured to be placed between a garment worn by the person and the person's body. If the contact between the device and person's body is lost, the device initiates an alarm process through a mobile device (such as a smart phone) carried by the person. The fact that the device is clipped or otherwise held between the person's clothing and body facilitates initiation of the alarm process if the person's clothing, and in particular the garment to which the device is coupled, is removed from the person, as may happen in an attack on the person by another.

20 Claims, 19 Drawing Sheets

PERSONAL SECURITY ALARM SYSTEM

FIELD OF THE INVENTION

The present invention relates generally to personal security, and, more particularly, relates to a personal security device and system that detects the presence of human skin/tissue in contact or near contact with the device, and when such contact is lost the device initiates an alarm.

BACKGROUND OF THE INVENTION

There are a number of personal security products on the market that range from defensive devices to devices that generate loud sounds and flashing lights. There are some alarm devices that can be activated by a person to send an alarm signal. From a connected device, such as a cellular telephone device. These devices all require the user to activate them, and/or manipulate them, which means they may be improperly activated/used or a person may be unable to sufficiently operate them under the stressful conditions of an attack or other hostilities being directed at them.

Therefore, a need exists to overcome the problems with the prior art as discussed above.

SUMMARY OF THE INVENTION

In accordance with some embodiments of the inventive disclosure, there is provided a device for personal security. The device includes a body having a first side and a second side that is opposite the first side. The device further includes a sensor disposed in the body and facing outward at the first side of the body. The sensor is configured to detect a change from first being in contact with a skin of a wearer of the device and then not being in contact with the skin of the wearer. The device also includes a garment attachment at the second side of the body that is configured to attach the body to a garment such that the body is positioned between the garment and the skin of the wearer of the device. The fact that the sensor and garment attachment are on opposite sides of the body facilitate placement of the device between the garment and the wearer. The device also includes a radio transceiver disposed in the body that transmits an alarm message upon the sensor detecting the change from being in contact and then not being in contact with the skin of the wearer.

In accordance with a further feature, the garment attachment comprises a clip that captures a portion of the garment between the clip and the body of the device.

In accordance with a further feature, the garment attachment comprises a portion of a hook and loop material that mates with a corresponding and complementary portion of the hook and loop material disposed on the garment.

In accordance with a further feature, the sensor and the radio transceiver are housed together in a component that is inserted into and retained by the body.

In accordance with a further feature, the component is a smart watch.

In accordance with a further feature, the radio transceiver is a personal area network transceiver, and wherein the alarm message is transmitted to a mobile phone device.

In accordance with a further feature, the radio transceiver is a cellular transceiver, the device further includes a satellite location receiver, and the alarm message includes a location of the device.

In accordance with a further feature, the sensor is configured to sense at least one biometric parameter of the wearer.

In accordance with a further feature, the sensor is configured to sense at least one of a biometric parameter of the wearer, a temperature, or an ambient light level.

In accordance with a further feature, the garment attachment include a magnet.

In accordance with a further feature, there is further included a microphone, and wherein transmitting the alarm message includes transmitting audio information produced by the microphone.

In accordance with some embodiments of the inventive disclosure, there is provided a method that includes providing a personal security device including a body having a first side and a second side that is opposite the first side, a sensor disposed in the body and facing outward at the first side of the body, a garment attachment at the second side of the body, and a radio transceiver. The method further includes attaching the personal security device using the garment attachment to a garment worn by a wearer and positioning the personal security device between the wearer and the garment such that the sensor is in contact with a skin of the wearer. The method also includes the personal security device, via the sensor, determining that the sensor has lost contact with the skin of the wearer. The method further includes, responsive to determining that the sensor has lost contact with the skin of the wearer, transmitting an alarm message via the radio transceiver.

In accordance with a further feature, providing the personal security device with the garment attachment comprises providing the personal security device with a clip at the second side of the body that is configured to clip over an edge of the garment and attaching the personal security device to the garment comprises placing the clip over the garment at the edge of the garment.

In accordance with a further feature, the body is a holder, and wherein the sensor and the radio transceiver are contained together in a component that is held in the holder.

In accordance with a further feature, the sensor is a biometric sensor, determining that the sensor has lost contact with the skin of the wearer comprises determining that the biometric sensor can no longer sense a biometric parameter of the wearer.

In accordance with a further feature, the sensor is a light sensor, determining that the sensor has lost contact with the skin of the wearer comprises determining that the light sensor is detecting an increase in a light level.

In accordance with a further feature, transmitting the alarm message via the radio transceiver comprises transmitting the alarm message to a mobile phone device to which the personal security device is wirelessly linked via the radio transceiver.

In accordance with a further feature, transmitting the alarm message via the radio transceiver comprises transmitting the alarm message to a server via a cellular infrastructure.

In accordance with a further feature, the personal security device is further provided with a satellite location receiver, transmitting the alarm message comprises transmitting a location of the personal security device as indicated by the satellite location receiver.

In accordance with a further feature, the personal security device is further provided with a microphone, transmitting the alarm message comprises transmitting an audio signal received at the microphone.

Although the invention is illustrated and described herein as embodied in a personal security alarm system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the terms "longitudinal" and "elongated" should be understood to mean in a direction corresponding to an elongated direction of the structure being referenced or described. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
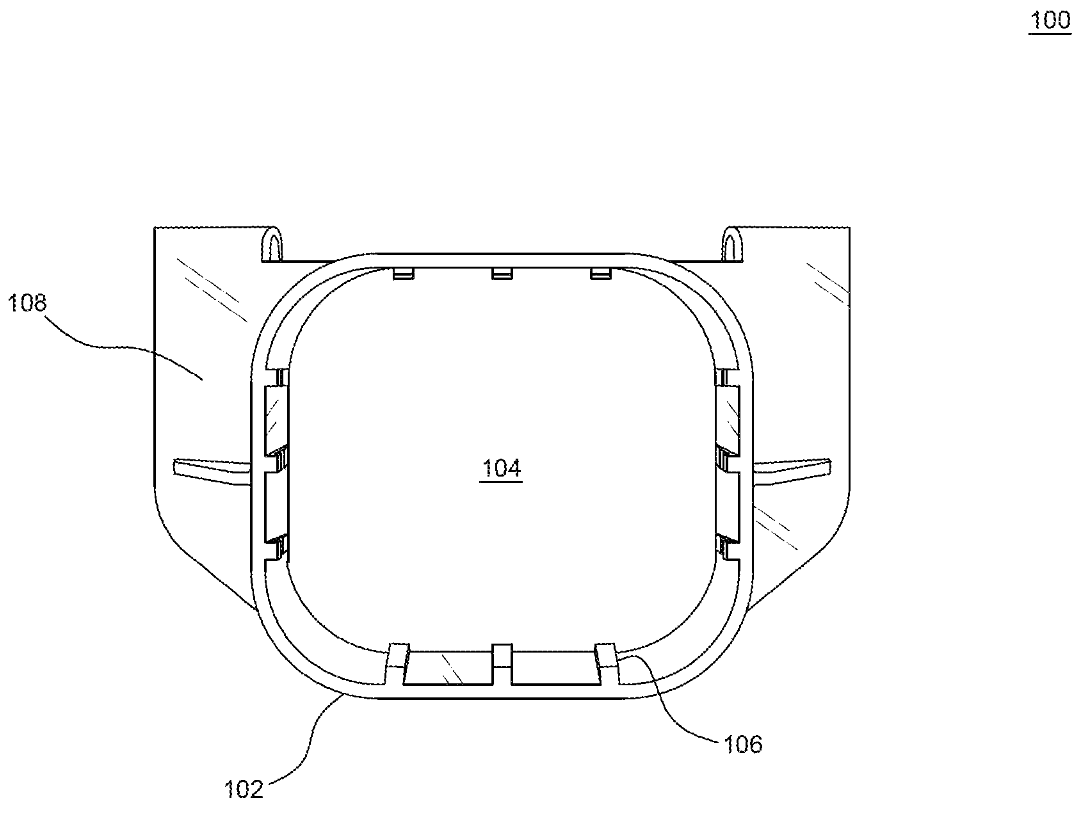
FIG. 1 shows a front view of a clip-on holder for holding a device for sensing skin contact and generating an alarm upon a loss of skin contact, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present inventive disclosure provides a novel and efficient personal alarm device and system. Embodiments of the inventive disclosure provide a device that can clip onto an article of clothing and which senses the presence of skin in contact, or very close contact, with the device. If and when such contact is lost, as would occur if a person's clothes were pulled or ripped from their body, the device will generate an alarm. The device can be wirelessly connected to a mobile telephone device, which can send an alarm message to a monitoring entity. The alarm information can include location coordinates so that authorities and/or other parties can be notified of the alarm in order to respond.

Figure 2:
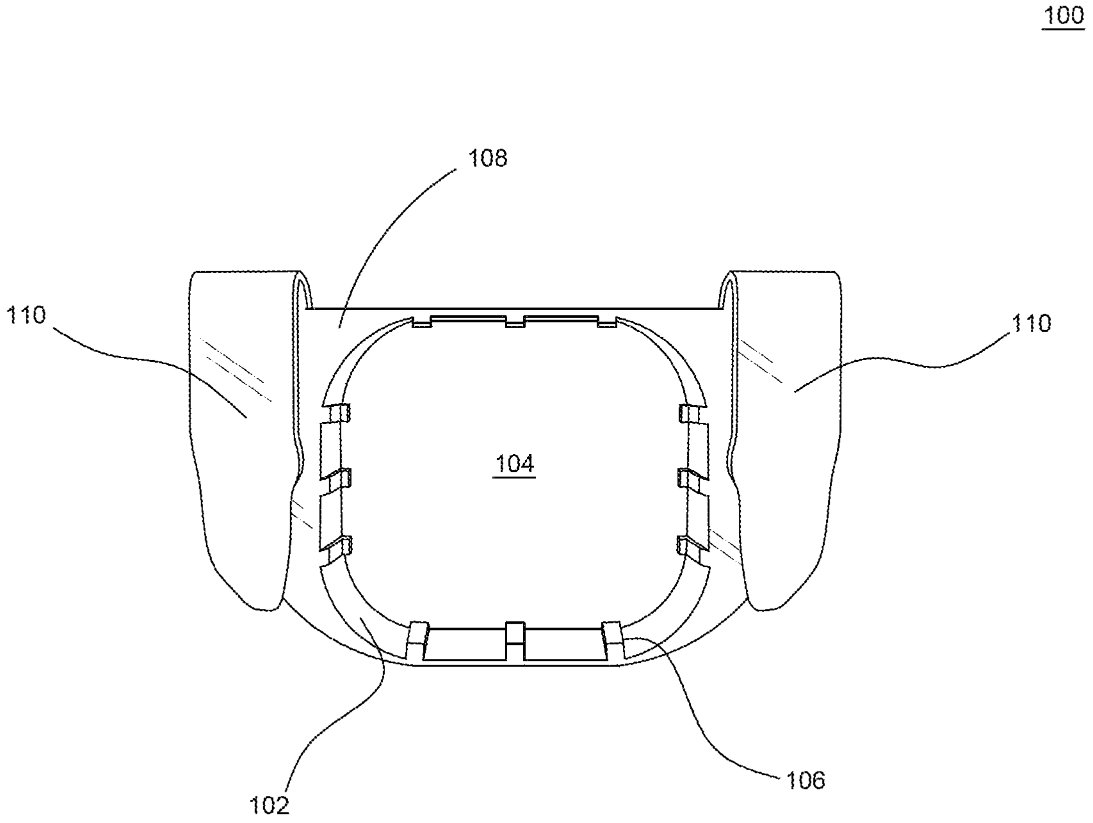
FIG. 2 shows a rear view of a clip-on holder for holding a device for sensing skin contact and generating an alarm upon a loss of skin contact, in accordance with some embodiments.
Figure 3:
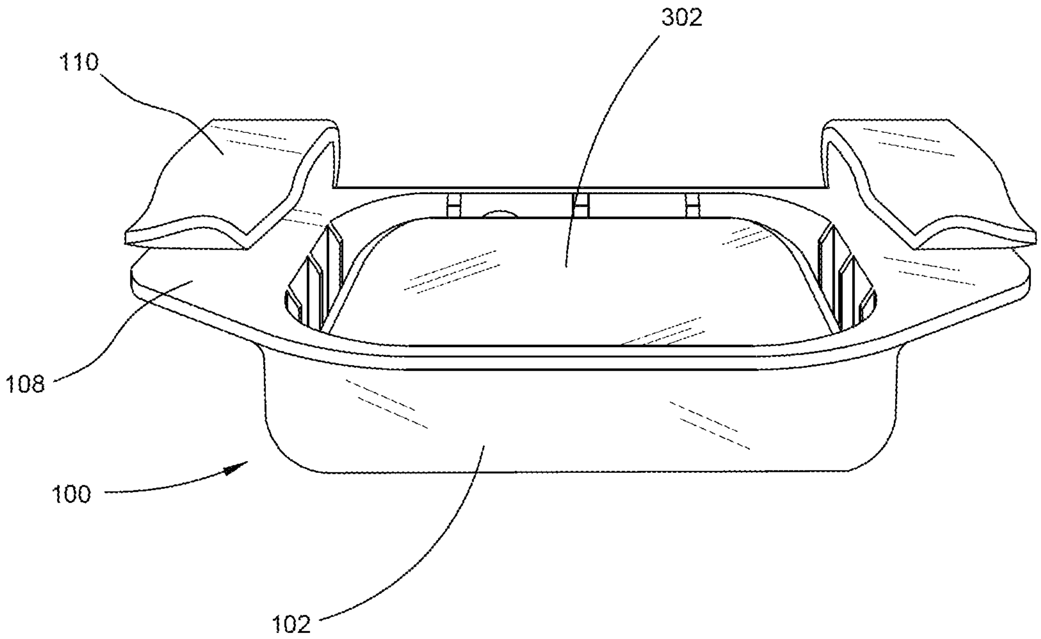
FIG. 3 shows a perspective rear view of a clip-on holder for holding a device for sensing skin contact and generating an alarm upon a loss of skin contact, in accordance with some embodiments.

FIG. 1 shows a front view of a body in the form of a clip-on holder 100 for a device for personal security. The holder 100 is configured to hold a skin sensing and communication component. The skin sensing and communication component is configured to sense the presence of skin immediately adjacent the component, and generate an alarm upon detecting a loss of skin contact, in accordance with some embodiments. The alarm is manifested as a message that is transmitted to another nearby device (e.g., a mobile phone device) that, in turn, can transmit an alarm message to another entity in order to direct assistance to the person using the device. The holder 100 can be configured to hold the skin sensing and communication component to an article of clothing in a position where the component can be immediately adjacent bare skin. As used here, the term "immediately adjacent" means an outer surface of the skin sensor is in contact with the wearer's skin, or at least mostly in contact with the wearer's skin to a degree that allows the skin sensor to differentiate between skin being present and the skin no longer being present at the surface of the sensor. The component can be, for example, a smart-watch device that has had the wrist straps removed, although any equivalent device can be used. FIG. 2 shows the rear of the holder 100, and FIG. 3 shows the holder 100 with the component, a smart watch device 302, mounted in the holder 100.

The holder 100 includes a wall 102 that extends from a base 108 at the front side of the holder. The wall 102 is sized to surround an opening 104 that is the same shape and size as the smart watch device 302. To account for minor variations and dimension tolerances, there can be ribs 106 along the inside surface of the wall 102 which ensure a suitable friction fit between the smart watch device and the wall 102. At the rear side of the holder 100 there can be clips 110 that act as a garment attachment and are configured to clip over an edge of a garment and hold the garment between the clips 110 and the base 108. The clips 110 are spring elements that are in contact with the base 108 and their distal ends, and when deflected away from the base 108 create a force towards the base 108 so that the clips 110 can essentially pinch the garment against the base 108 with enough force to hold the holder 100 in place on the garment. In FIG. 3 a smart watch device 302, with the wrist straps removed, is shown inserted into the holder 100. The watch face is facing the rear of the holder 100, and thus the back side of the smart watch device 302, which would normally rest against a user's wrist, is at the front side of the holder. As is well known, many smart watch devices have a pulse oximeter sensor at the backside of the watch device 302. This can be used to measure oxygen in the wearer's blood using light emitted by light emitting diodes at the back surface of the smart watch device 302, and absorption of the light is sensed by a light sensor at the back of the smart watch device 302. The light absorption indicates the oxygen level in the blood. Specifically, the difference in absorption of different wavelengths of light is related to the amount of oxygen held by hemoglobin in the blood. In order for the oximeter function to work, the back of the smart watch device must be in contact with the wearer's skin. Thus, when the smart watch device is unable to determine an oximetry value, or when the value changes abruptly and significantly, it can be assumed that the smart watch device 302 is no longer in contact with the wearer's skin. Other methods of sensing skin contact can be used as well, including resistive sensing where the electrical resistance of the skin is lower than an open circuit between two electrodes, and when the resistance is abruptly increased, above the range of human skin electrical resistance, it can be assumed that the device is no longer in contact with the wearer's skin.

Various other configurations of the body can be used. In some embodiments the skin sensing and communication component can be embedded in the body, rather than being a separate device that is held by the body. In other embodiments the holder can allow the smart watch device to be inserted through the top into the holder. Other structures besides the clips 110 can be used equivalently to hold the body to a garment, including, for example, the use of hook and loop fastener material, pins, adhesive tape, and so on.

Figure 4A:
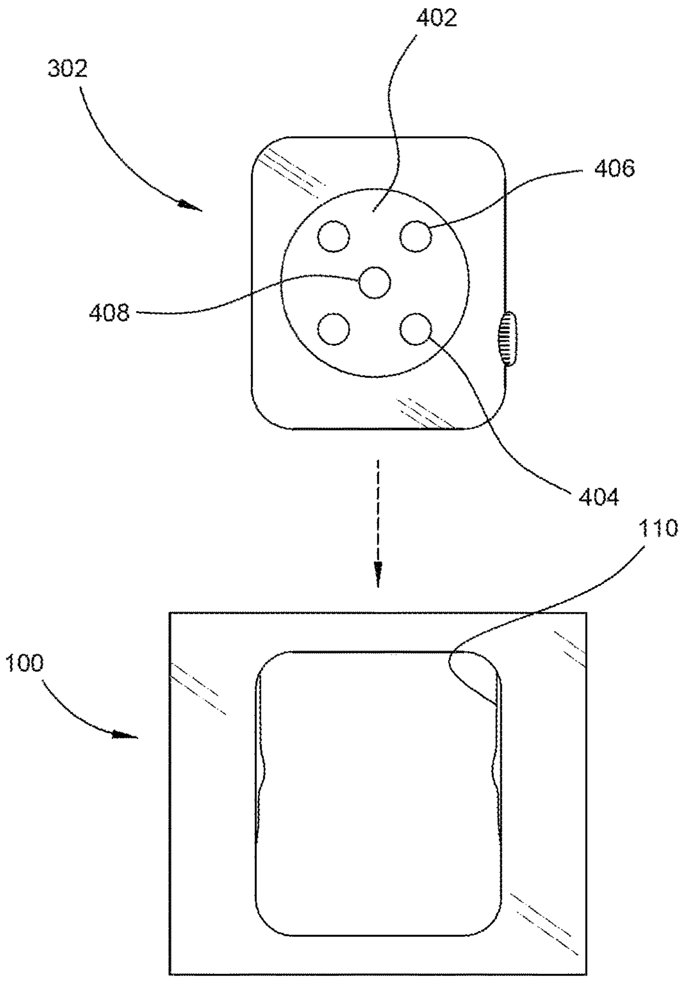
FIG. 4A shows a front view of a device for sensing skin contact and generating an alarm being inserted into a clip-on holder, in accordance with some embodiments.
Figure 4B:
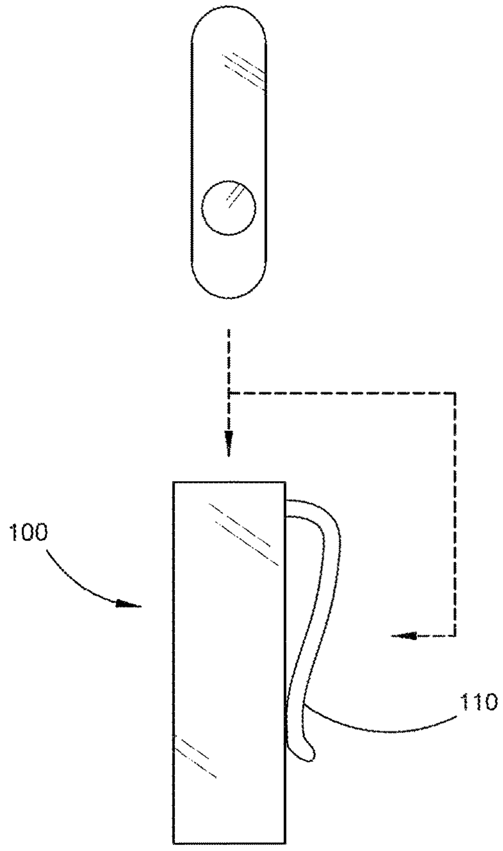
FIG. 4B shows a side view of a device for sensing skin contact and generating an alarm being inserted into a clip-on holder, in accordance with some embodiments.
Figure 5:
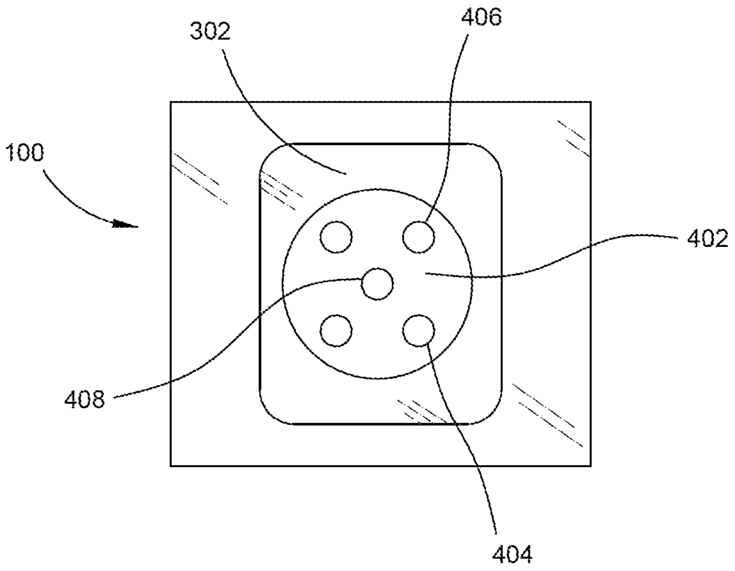
FIG. 5 shows a front view of a device for sensing skin contact and generating an alarm after being inserted into a clip-on holder, in accordance with some embodiments.

FIG. 4A shows a front view of a device for sensing skin contact and generating an alarm being inserted into a clip-on holder 100, in accordance with some embodiments. FIG. 4B shows a side view of the same. The device is a smart watch device 302, which includes, at its back side 402, several LEDs 404, 406 and a light sensor 408. The holder 100 can be configured to receive the smart watch device 302 at the top, or at the side as shown in FIGS. 1-3. Once the smart watch device 302 is inserted in the holder, it appears as shown in FIG. 5. Again, although a smart watch device is shown being used here, it will be appreciated by those of skill in the art that an integrated device for personal security can be designed on the same principles of detecting being in contact with a wearer's skin, and then losing contact, and up detecting the loss of contact, transmitting an alarm message.

Figure 6:
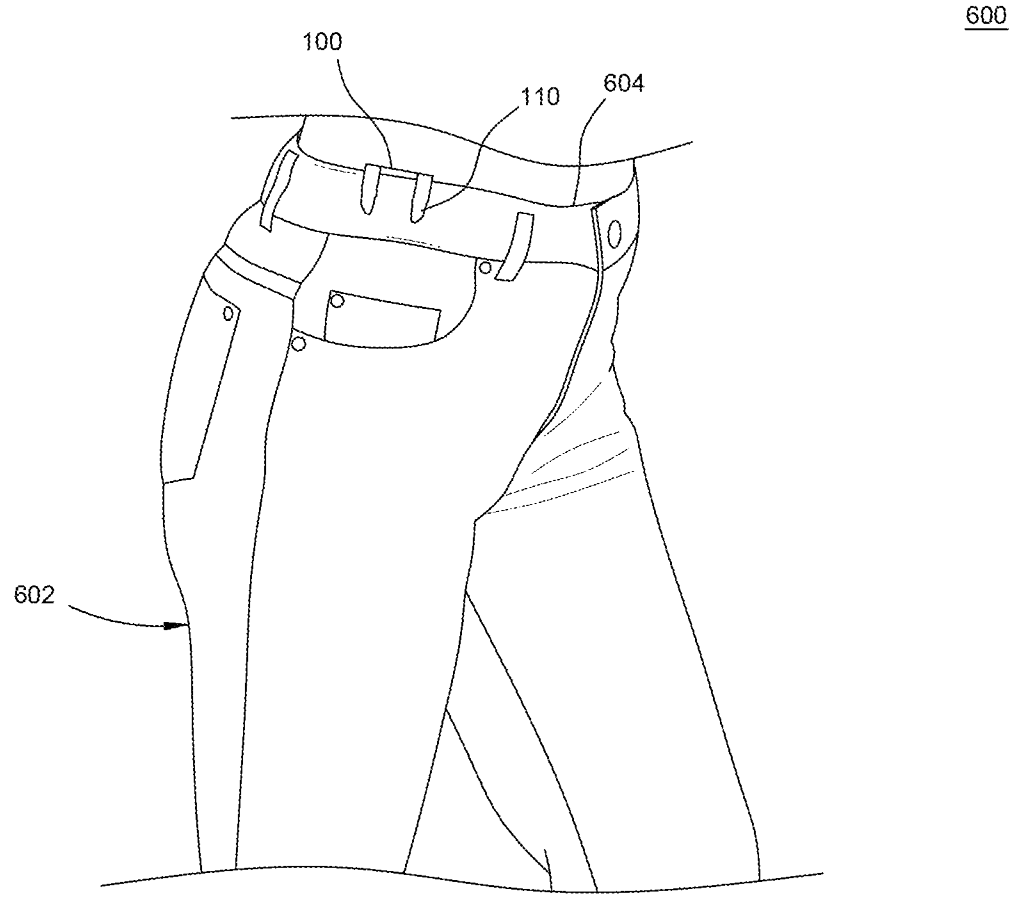
FIG. 6 shows one example of where a device for sensing skin contact and generating an alarm can be worn with the clip-on holder on a garment being worn by a person, in accordance with some embodiments.

FIG. 6 shows one example 600 of where a device for sensing skin contact and generating an alarm can be worn with the clip-on holder on a garment being worn by a person, in accordance with some embodiments. In this example, a pair of pants 602 is shown, and the holder with the smart watch device in place in the holder is clipped to the waistband 604 of the pants 602 such that the holder is between the pants and the wearer's skin. The smart watch is oriented to that the back of the smart watch device is against the wearer's skin. Once in place, a security mode can be activated via an application program on the wearer's phone device. The application program can configure the smart watch device to continuously operate the oximeter function, or another skin contact sensing function, and if there is a change indicating loss of contact, then an alert message is sent to the phone device which then transmits an alarm message to another entity. In some embodiments, the smart watch device may simply provide a stream of periodic samples to the phone device, which evaluates the samples to determine if skin contact is still present or if it has been broken.

By sensing the loss of skin contact, and generating an alarm, the alarming is automated and does not need to be activated or actuated by the wearer. Thus, in the case where the wearer is attacked, and the garment holding the device is disturbed to the point where skin contact is lost, the wearer may be unable to activate any other device or use some other security measure. The loss of contact between the device and the wearer's skin will trigger the alarm function.

Figure 7A:
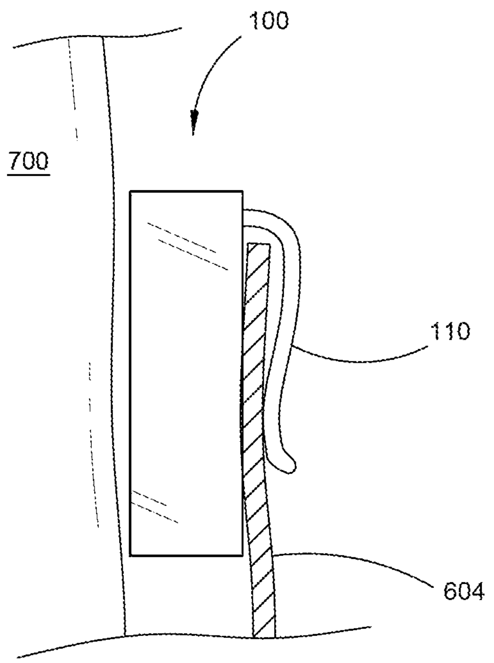
FIG. 7A shows a device for sensing skin contact and generating an alarm in a holder while in contact with the wearer's skin, in accordance with some embodiments.
Figure 7B:
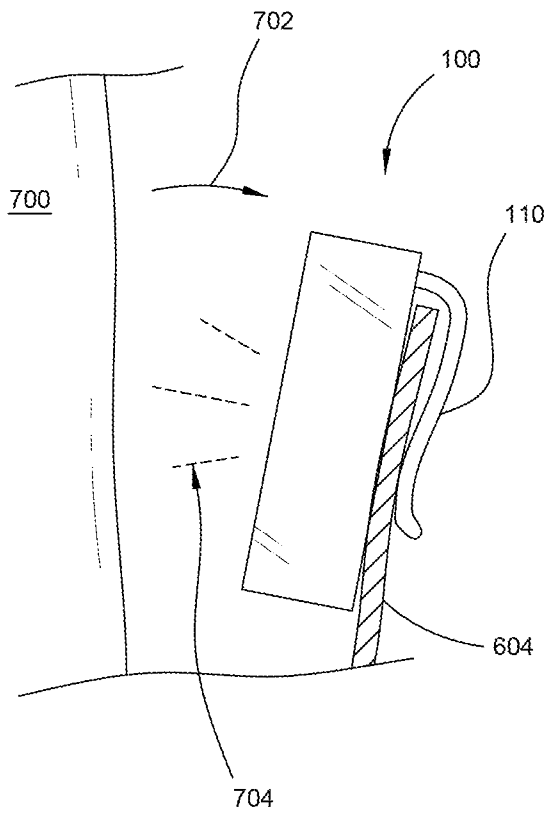
FIG. 7B shows a device for sensing skin contact and generating an alarm in a holder after being separated from contact with the wearer's skin, in accordance with some embodiments.

FIG. 7A shows a device for sensing skin contact and generating an alarm in a holder while in contact with the wearer's skin, and FIG. 7B shows the device for sensing skin contact and generating an alarm in a holder after being separated from contact with the wearer's skin, in accordance with some embodiments. The holder 100 is shown clipped onto the waistband 604 of the wearer's pants, as shown in FIG. 6. In FIG. 7A the device is against the wearer's skin 700. In FIG. 7A the device can determine that skin is present and immediately adjacent the device, either directly, or by inferring through measuring an oxygen level in the blood of the wearer. In FIG. 7B, the device is moved away from the wearer's skin 700, as indicated by arrow 702. In which case, there is no longer contact with the wearer's skin and the sensing 704 will indicate such.

Figure 8:
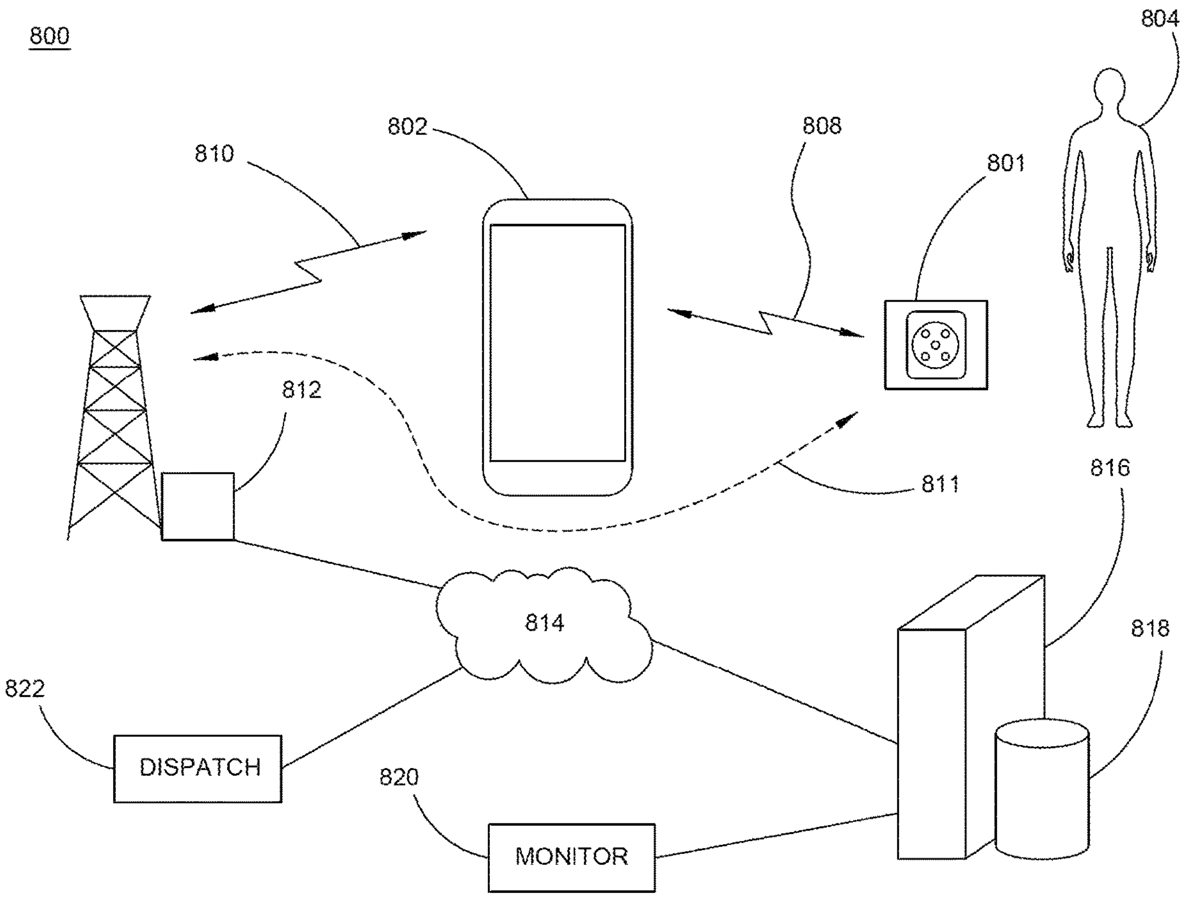
FIG. 8 shows a system diagram for a personal alarm system in which an alarm message is sent to a server, which in turn automatically initiates an alarm procedure, in accordance with some embodiments.

FIG. 8 shows a system diagram for a personal alarm system 800 in which an alarm message is sent to a server 816, which in turn automatically initiates an alarm procedure, in accordance with some embodiments. A device 801 is configured to sense, or capture and transmit data from sensing, some parameter of a wearer 804 that requires the device 801 to be in contact with the wearer's skin. More precisely, the sensing components of the device 801 must be immediately adjacent to the wearer's skin. The wearer 804 attaches the device 801 to a garment or article of clothing being worn by the wearer 804 such that the sensing components of the device are in contact with the wearer's skin. The device, in addition to having the sensing components, includes a radio transceiver that allows the device 801 to communicate with another device, such as a mobile phone device 802. The radio transceiver can be a personal area network transceiver, such as those used in the radio communication protocol 808 known by the trade name BLUETOOTH, or one of the variations thereof. As virtually all modern mobile phone devices are equipped with a personal area network transceiver configured in accordance with the BLUETOOTH protocol, as are all smart watch devices, it is a convenient means of communicating between the security device 801 and the mobile phone device 802. The mobile phone device 802 includes an operating system that allows application programs to run on the mobile phone device. An application program for the security operation is installed on the mobile phone device 802 and uses the radio link 808 to communicate with the security device 801. Of course, the mobile phone device 802 is capable of communicating using cellular voice and data radio protocols and can connect to a cellular infrastructure 812 using a cellular communication radio link 810, which gives the mobile phone device 802 access to the Internet 814.

In some embodiments, in addition to the security operation, the application program on the mobile phone device 802 can display biometric data being sensed by the security device 801. For example, heart rate, blood oxygen level, and other biometric parameters routinely monitored by smart watch devices, for example, can be reported to the mobile phone device 802 and displayed or accessed by the wearer on the mobile phone device 802 in a user interface rendered by the application program on a display of the mobile phone device 802.

The wearer 804 operates the mobile phone device via the application program to connect to the security device 801 via wireless link 808, and then to initiate the skin contact monitoring. Thereafter, the security device 801 begins its monitoring activity. The device 801 can either periodically message the phone device 804, indicating that contact is still occurring, or the security device can transmit sensing data to the phone device 804. If contact is broken between the device 801 and the wearer 804, the security device 801 either transmits an alarm message to the phone device 804, or the phone device 804 determines contact has been lost based on the change in sensing values being transmitted by the security device 801. Alternatively, if communication with the security device 801 is lost, the phone device 802 can commence the alarm process.

The phone device 802 can be configured to either immediately commence the alarm process, or, for a brief period of time, allow the wearer 804 to override the alarm process by entering a code or some other input. In some embodiments, the phone device 802 can be configured to recognize both a legitimate code that shuts off the alarm process, and a "fake" code that simulates shutting down the alarm process but causes the phone device to commence with the alarm messaging. When sending an alarm message, the phone device gathers data to be included with the message, such as the geographic location as indicated by the satellite location receiver on the phone device 802. An alarm message is then transmitted from the phone device 802 to the security server 816 including the ancillary data such as location coordinates. The server 816, in response to receiving the alarm message, can forward alarm messages to contacts indicated by the wearer 804 in account information stored in a database 818 connected to the server 816. Further, the server 816 can determine provide the received information to a monitoring station 820, which can be a terminal or computer connected to the server that is monitored by a person. The person can evaluate the information and take action to ensure it is not a mistake. Once verified, the server or the monitoring personnel can contact the appropriate emergency services dispatch 822 (e.g., police) to send assistance to the location of the wearer 804. In addition, the phone device 802 can turn on its microphone and camera and transmit a live audio signal and image data to the server 816 in a media stream that can be further patched through to the dispatch 822.

In some embodiments the device 801 is an integrated, stand-alone device and is configured to communicate directly with the cellular infrastructure 812. In such embodiments the functionality of the application program running on the phone device 802 is integrated into the personal security device 801 itself, and the personal security device 801 contains a cellular transceiver capable of communicating using cellular signals 811 with the cellular infrastructure 812.

Figure 9:
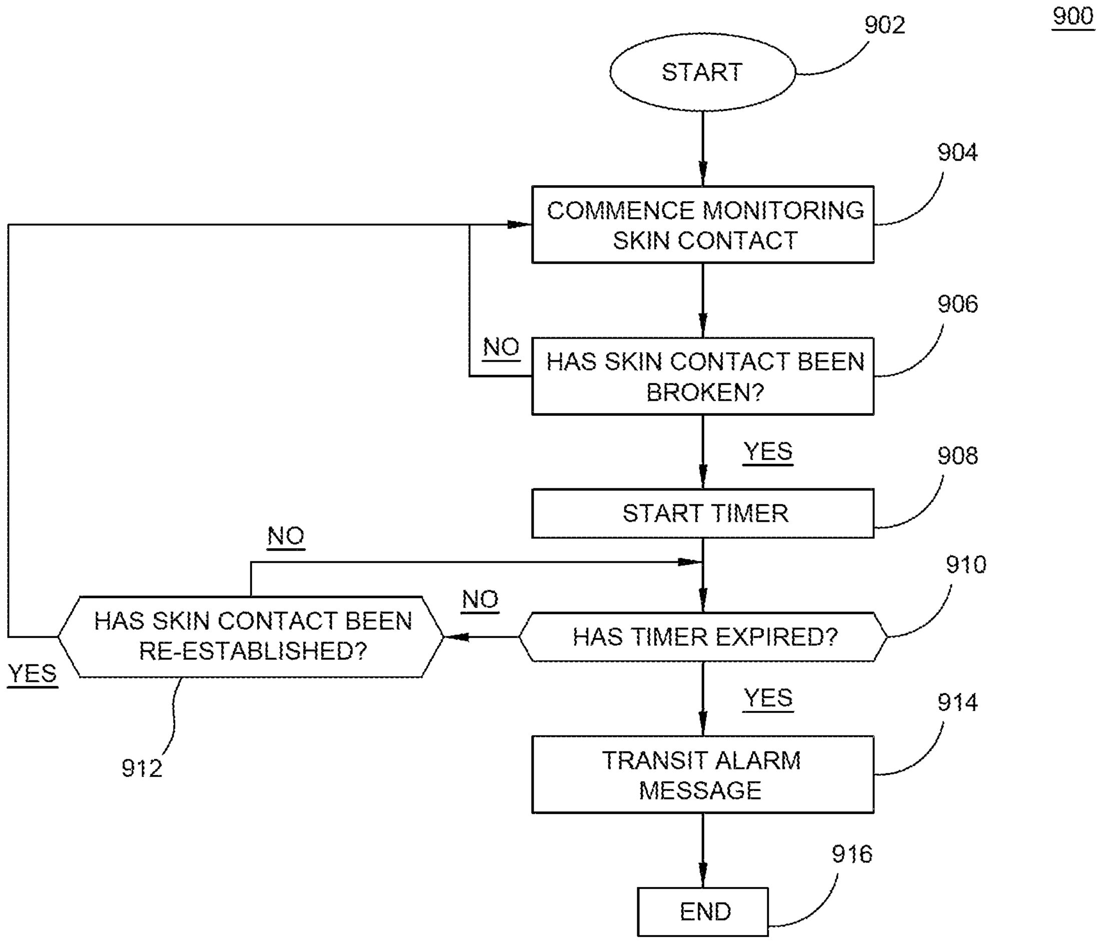
FIG. 9 shows a flow chart diagram of a method for generating an alarm message by a personal security device, in accordance with some embodiments.

FIG. 9 shows a flow chart diagram of a method 900 for generating an alarm message by a personal security device, in accordance with some embodiments. The method 900 is one method of facilitating an alarm message to other people via the personal security device. At the start 902 the personal security device is attached to a garment or article of clothing, and positioned between the garment and the wearer's skin with a sensor of the personal security device positioned immediately adjacent the wearer's skin. The personal security device is powered on and operating, and is in communication with a phone device that operates an application program for controlling the personal security device, and commencing an alarm process when the personal security device either sends an alarm message to the phone device, or the sensor data being sent by the personal security device to the phone device indicates that contact with the wearer has been lost, as determined by the phone device. At step 904 the wearer can operate the phone device to command or otherwise control the personal security device to start monitoring via its sensor. The monitoring indicates, directly or indirectly, that the sensor of the personal security device is in contact with the wearer's skin. In step 906 the personal security device or the phone device evaluates, based on the sensor data, whether the skin contact has been broken. If not, the monitoring simply continues. When it is determined that contact has been broken, then in step 908 a short timer can be initiated at either the phone device, or the personal security device, or both. Prior to the expiration of the timer, the method can evaluate if contact has been reestablished in step 912. This allows for momentary losses of contact that can occur such as when the wearer adjusts the garment to which the personal security device is attached. The timer duration can be on the order of one to five seconds, and can be adjusted by the wearer through the application program on the phone device. When contact is reestablished in step 912, then the timer can be reset and monitoring at steps 904, 906 resume. However, if the timer expires, then in step 914 an alarm message is transmitted from the phone device to the monitoring service server. In some embodiments, the personal security device can first send an alarm message to the phone device in order to cause the phone device to transmit the alarm message. The method 900 can end 916 after sending the alarm message, but other methods can then be undertaken. For example, the phone device can commence transmitting audio and image information.

Figure 10:
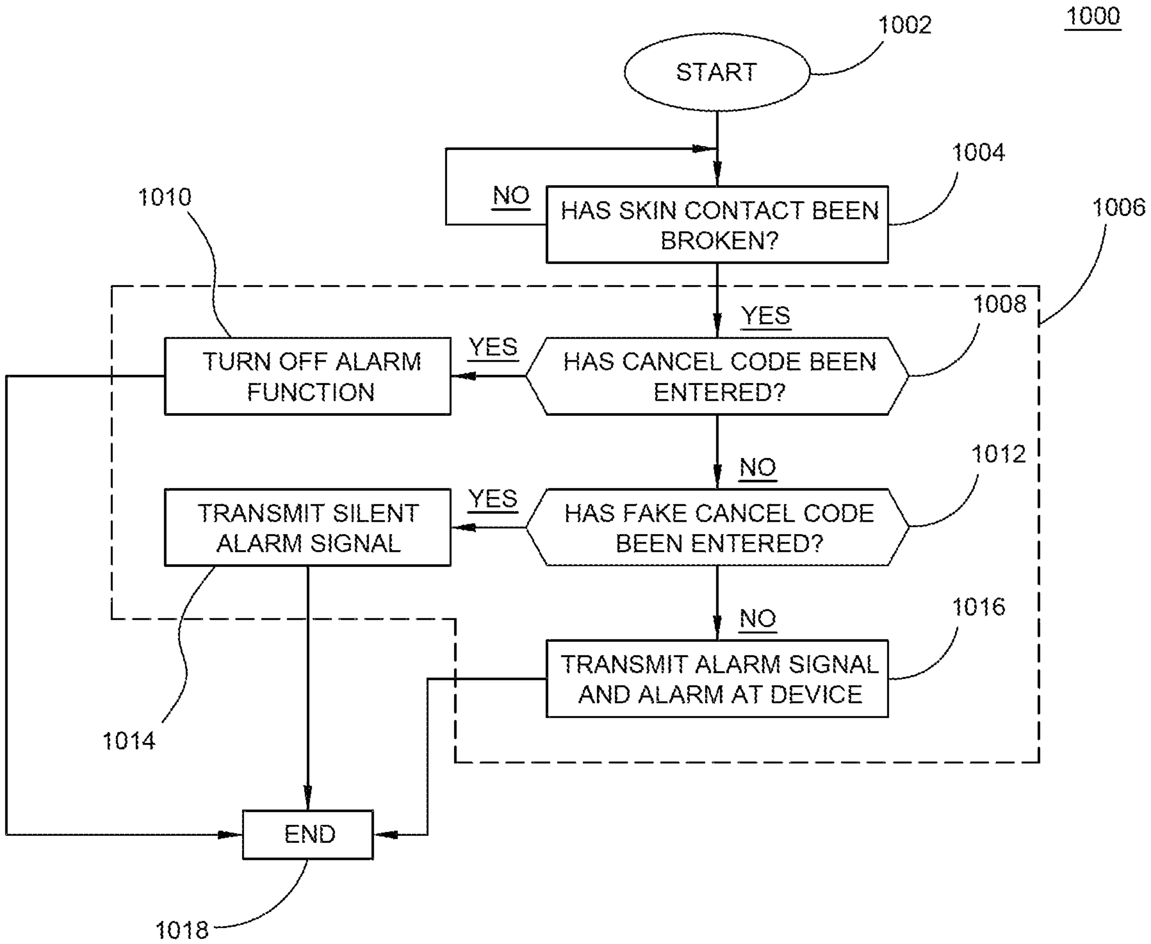
FIG. 10 shows a flow chart diagram of a method for generating an alarm message by a personal security device in which an alarm code can be used to shut off the personal security device or silently trigger an alarm message transmission, in accordance with some embodiments.

FIG. 10 shows a flow chart diagram of a method 1000 for generating an alarm message by a personal security device in which an alarm code can be used to shut off the personal security device or silently trigger an alarm message transmission, in accordance with some embodiments. The method 1000 can be added to method 900 by adding the steps in box 1006 between steps 910 and 914. Start 1002 and skin contact monitoring step 1004 are substantially the same as steps 902, 904, 906. However, when the method 1000 determines that the contact between the wearer and the personal security device has been broken, and not for a momentary period, then the personal security device and phone device and present an input interface asking the wearer to enter a code to cancel the alarm during a brief time period after step 1004. Thus, at step 1008, a timer is running while the input interfaces are presented. If the wearer enters a shut off code, before the expiration of the timer, then in step 1010 the alarm function process will be shut down. This can occur, for example, if the user removes the garment to which the personal security device is attached. In conjunction with the timer in step 1008, the phone device can issue an audible alert to alert the wearer that the alarm process is about to commence, and allow them to enter the shut down code. In step 1012, the wearer may enter an alternate code that causes the phone device to act as if it is shutting down the alarm process, but in step 1014 the alarm message is transmitted without the phone device or personal security device undertaking any visually or audibly perceptible actions. This can be used by a wearer who is being threatened to shut off the alarm process to cause a hostile entity to believe the alarm process has been shut off, as in step 1010. If no code is entered at step 1008 or step 1012, then the alarm process commences as in step 1014, and in addition the phone device and personal security device may commence issuing audible alert sounds to, hopefully, draw the attention of other people who may be in the area.

Figure 11:
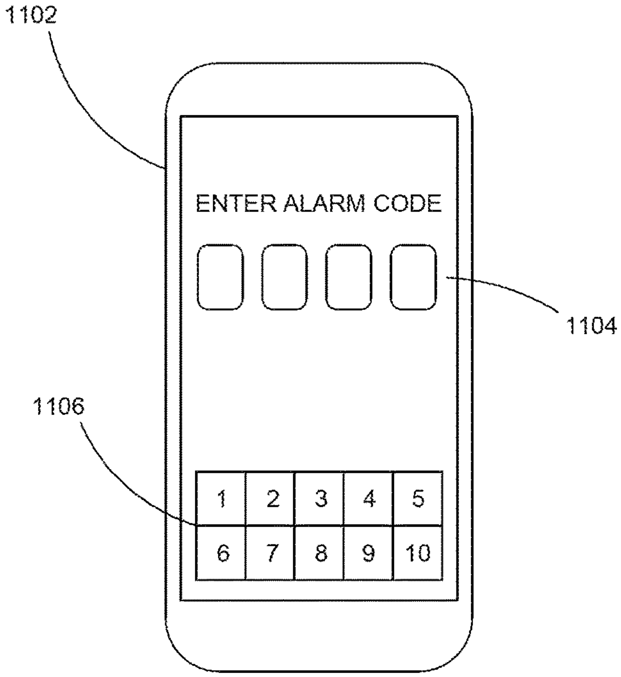
FIG. 11 shows an interface diagram of a mobile phone device prompting a user for an alarm code to either deactivate the personal security device or activate a silent alarm mode.
Figure 12:
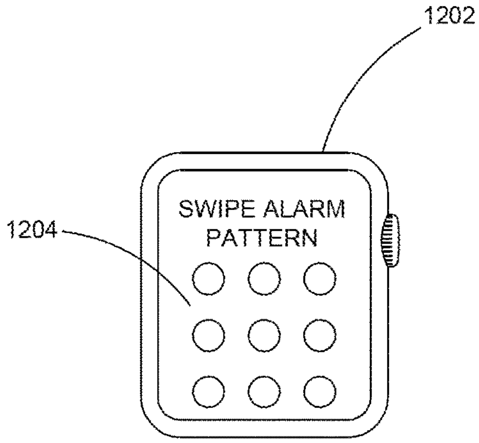
FIG. 12 shows an interface diagram of a personal security device prompting a user for an alarm pattern to either deactivate the personal security device or activate a silent alarm mode.

FIG. 11 shows an interface diagram of a mobile phone device prompting a user for an alarm code to either deactivate the personal security device or activate a silent alarm mode, and FIG. 12 shows an interface diagram of a personal security device prompting a user for an alarm pattern to either deactivate the personal security device or activate a silent alarm mode. In FIG. 11, the phone device 1102 can present an input interface portion 1104 for receiving and displaying a code, and a keyboard portion 1106 that allows the wearer to enter the code using the touch screen function of the phone device 1102. The personal security device 1202 can likewise have a touch screen interface 1204 on which, for example, the wearer can enter a code, or, as indicated here, draw a pattern that known to the device, or the phone, or both. If the wrong pattern is entered it will be ignored. As with any alphanumeric code, there can be both legitimate and "fake" patterns for either shutting off the alarm process or commencing with the alarm process while making it appear that the devices are shutting off the alarm process.

Figure 13:
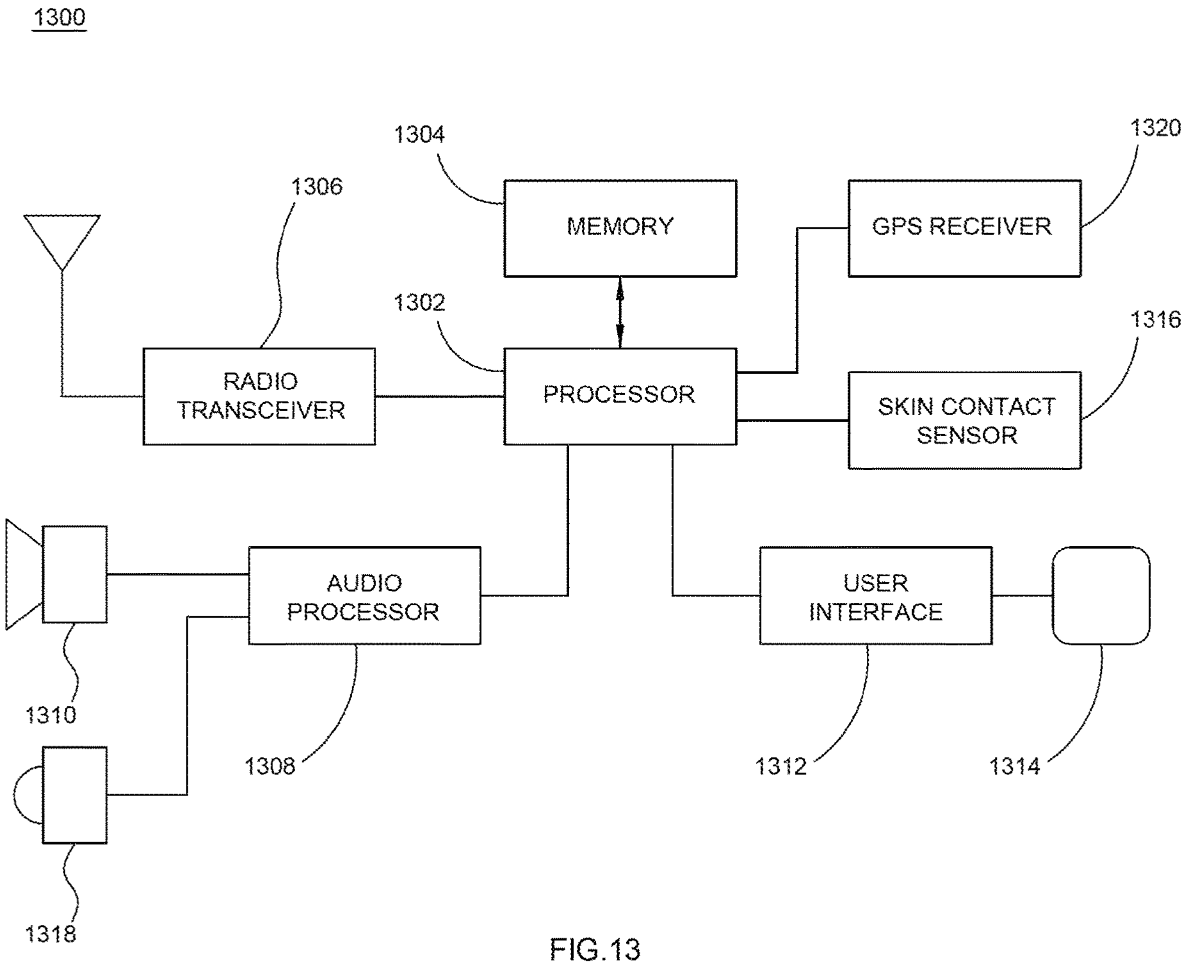
FIG. 13 shows a block schematic diagram of a personal security device, in accordance with some embodiments.

FIG. 13 shows a block schematic diagram of a personal security device 1300, in accordance with some embodiments. The circuit elements and electrical/electronic components shown here can be housed together in a component as a personal security device or as part of a personal security system. The personal security device 1300 can be implemented as a single purpose, integrated device, or it can be implemented as a more general-purpose device such as a smart watch device. In either case, the personal security device can have a processor 1302 that is capable of performing computer instruction code. The processor is coupled to an aggregate memory 1304 that can include both storage and scratch pad memory. Instruction code can be stored in the memory 1304 as well as real time variable data and other parameters. The processor is operably coupled to a skin contact sensor 1316. The skin contact sensor 1316 can be a sensor that performs a sensing activity and produce data that can indicate, directly or inferentially, whether the sensor is in contact with human skin. There are numerous technologies that can be used to determine that the sensor is in contact, or not, with human skin. As mentioned herein, for example, an oximeter can provide blood oxygen level data. The wearer's heartbeat (pulse) can be electrically sensed and monitored. If the heartbeat ceases for a period of time, it can be assumed that contact has been lost. Likewise, and electrical resistance of human skin can be used to complete a circuit in the sensor, and as long as the resistance value is within a known range, it can be assumed that the sensor is in contact with skin. If the resistance falls out of that range, then it can be assumed that contact has been lost, and the alarm process can commence. The electrical capacitance of skin can be sensed in some embodiments.

In general, the sensor 1316 is configured to detect a change from first being in contact with the skin of a wearer (or sufficiently close to actual contact to allow sensing), and then detect not being in contact with the skin of the wearer. That is, a change of signal produced by sensor when in contact, and then not in contact, is detected. Other types of skin contact sensing can be used equivalently. A non-exhaustive list of technologies that can be adapted for use in skin contact, and loss of contact sensing, can include blood oxygen sensing, electrical heartbeat sensing, third generation optical heartbeat sensing, high and low heart rate sensing, irregular heart rhythm sensing, sleep stage sensing, temperature sensing, compass sensing, altimeter sensing, sonar or echo sensing, muscle monitoring, acceleration sensing, gyroscopic sensing, ambient light sensing, capacitive sensing, pressure sensing, optical sensing, conductive fabric sensors, thermal sensors, among other types of sensor technologies that can be used to directly or inferentially determine when a garment is removed from the wearer, causing a loss of contact between the personal security device and the wearer.

Thus, if the sensor is a biometric sensor, then a biometric parameter of the wearer can be initially detected and monitored. If the personal security device is removed from contact with the wearer, then the sensor will detect an out-of-range signal value, for example, indicating that the sensor is no longer in contact with the wearer. If the sensor is a light sensor, then while the sensor is in contact with the wearer, a very low level of ambient light will be detected, and when the sensor is removed from contact with the wearer, the light level can increase substantially, indicating that contact between the sensor and the wearer has been lost. If the sensor is an electric capacitive or resistive sensor, then a change in capacitance or resistance will cause the value of the signal being sensed to change when the sensor is removed from contact with the wearer.

The processor is further coupled to a radio transceiver 1306. The radio transceiver 1306 can be a personal area network transceiver, operated according to a low power radio network protocol such as, for example, BLUETOOTH. In some embodiments the radio transceiver 1306 can be configured for cellular communications and is able to access cellular data networks directly. In some embodiments both types of radio transceivers can be present. Data can be both sent and received via the transceiver 1306. The transceiver 1306 can be used to link with the cellular phone device using the BLUETOOTH protocol in some embodiments, and in other embodiments the radio transceiver 1306, or a second radio transceiver in the personal security device 1300, can be configured to communicate with cellular data networks, such as those operating according to the Long Term Evolution (LTE) protocols. The processor can be further coupled to a user interface driver 1312 that can operate a user interface element such as a touch screen 1314 that can display information and receive input. The processor 1302 can be further coupled to an audio processor 1308 that can convert digital audio data to/from analog to digital, so that audio sounds can be played over a speaker 1310, and audio input can be collected via a microphone 1316. In some embodiments, a satellite location receiver 1320 can be included so that the personal security device 1300 can determine and report its location via the radio transceiver 1306.

Figure 14A:
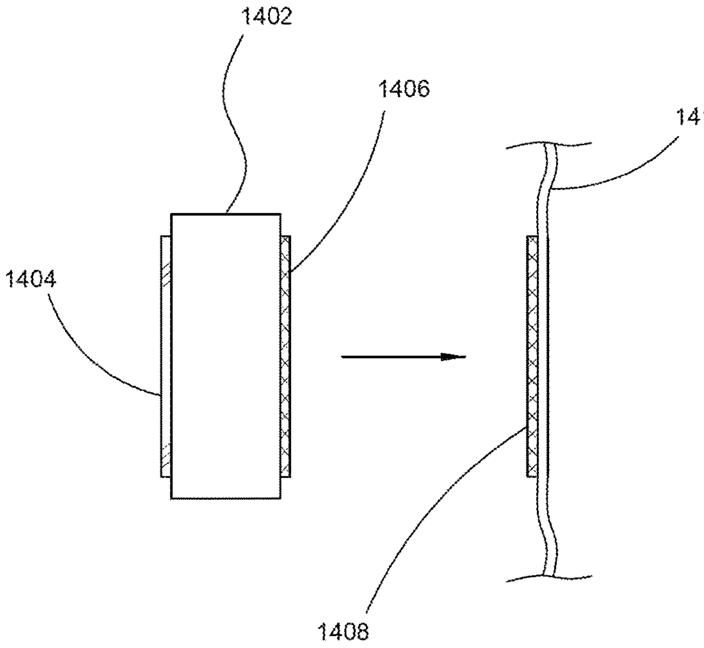
FIGS. 14A & 14B show a personal security device using hook and loop material to fasten the personal security device to a garment, in accordance with some embodiments.
Figure 14B:
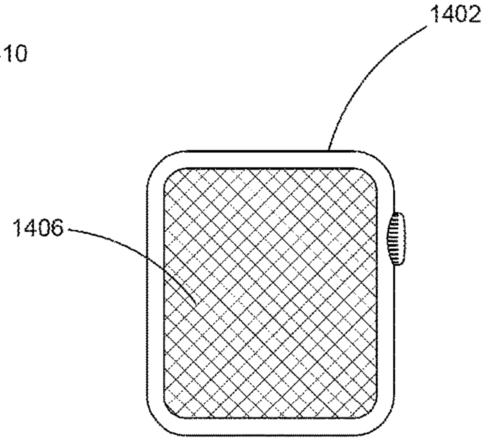
Figure 15A:
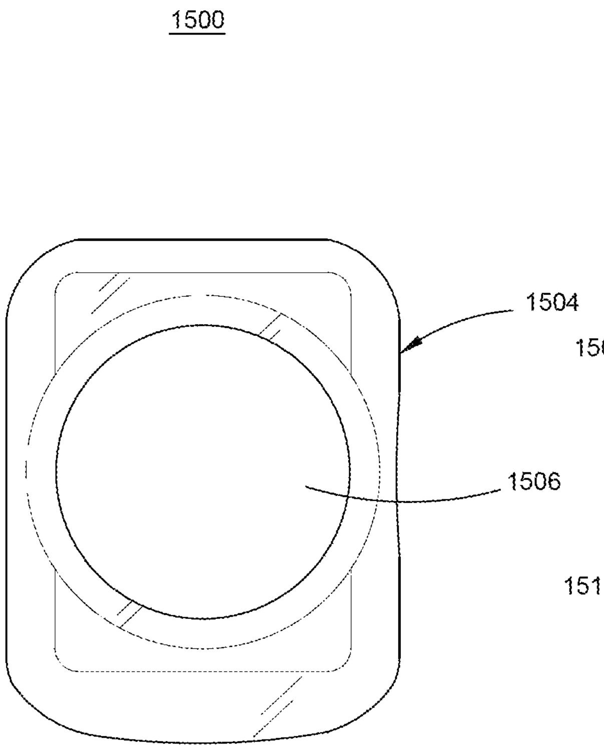
FIGS. 15A and 15B show a front view of a holder without and with a device for sensing skin contact, in accordance with some embodiments.
Figure 15B:
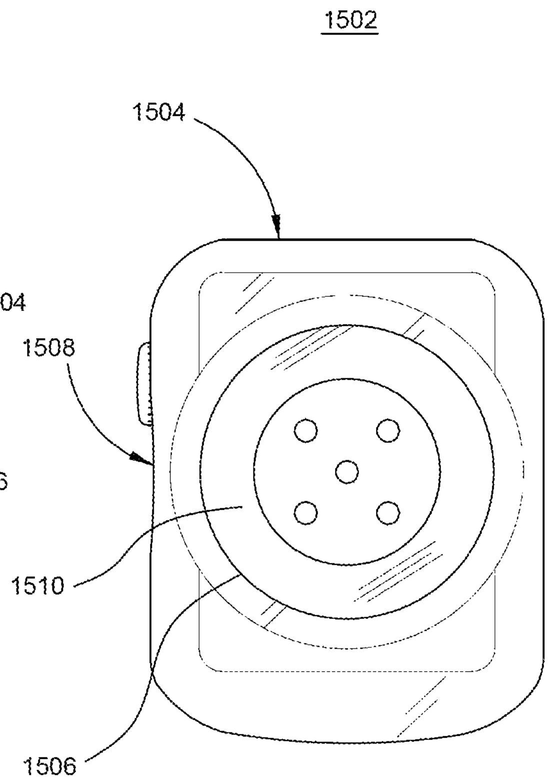

FIGS. 14A & 14B show a personal security device 1402 using hook and loop material 1406 as a garment attachment to fasten the personal security device 1402 to a garment 1410, in accordance with some embodiments. This method of attachment can be used as an alternative to a clip-on holder. The hook and loop material can be substantially similar to that known by the trade name VELCRO. A portion 1406 of the hook and loop material (either the hook or the loop side) is affixed to the rear side of the personal security device 1402. A corresponding and complementary portion 1408 of the hook and loop material is affixed to the garment 1410 at a location where the personal security device 1402 will be held against the wearer's skin. Once in place, as with the clip-on embodiment, the personal security device 1402 can commence operation. In some embodiments, instead of hook and loop material, the portions 1408, 1406 can be magnets that attract each other.

In FIGS. 15A, 15B, 16A, 16B, 17A, 17B, 18A, 18B, and 19 a holder is shown without and with a device for sensing skin contact and communicating with a mobile device. The views without the device for sensing skin contact are labeled as 1500 while those with the device shown are labeled 1502. Thus, all of the view 1500, 1502 show the same holder 1504, and the views 1502 show the same holder 1504 as in view 1500 and including the device 1508 for sensing skin contact disposed in the holder 1504. The device 1508 can be, for example, a smartwatch device with the watch straps removed to allow the smartwatch device to fit into the holder 1504. The holder 1504 has an opening 1506 at the front side to expose the skin sensor 1510 of the device 1508. The skin sensor 1510 is on what is considered to be the back or bottom side of the smart-watch device 1508.

Figure 16A:
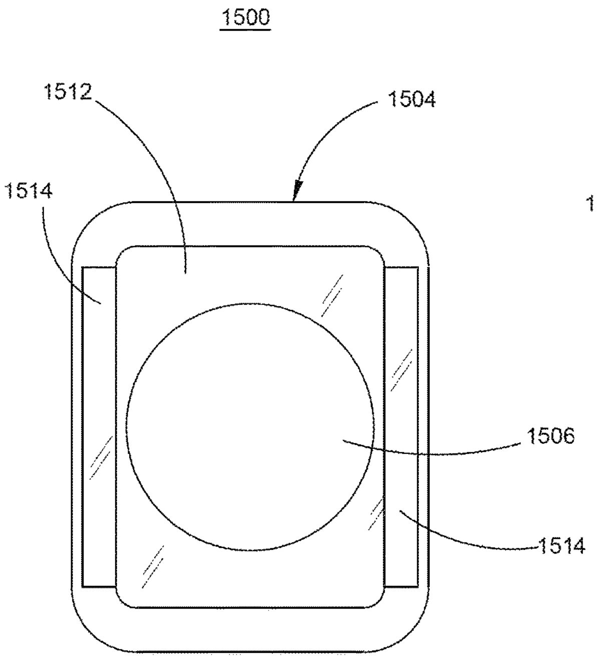
FIGS. 16A and 16B show a rear view of a holder without and with a device for sensing skin contact, in accordance with some embodiments.
Figure 16B:
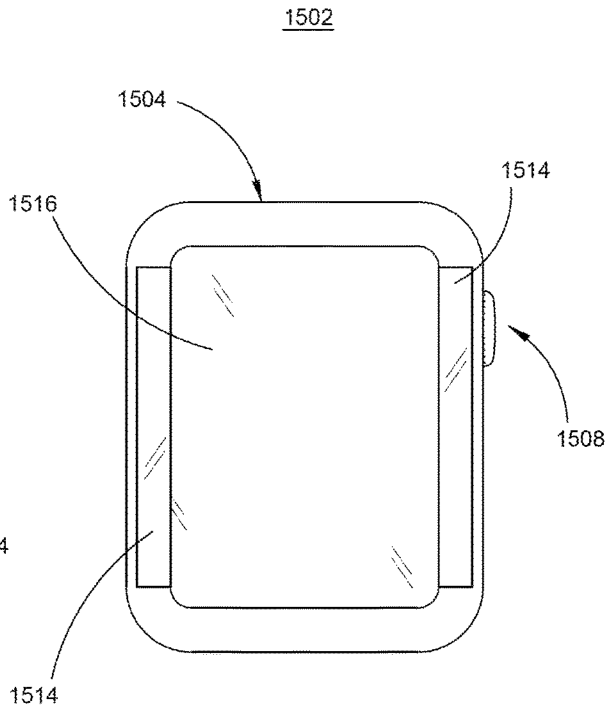
Figure 17A:
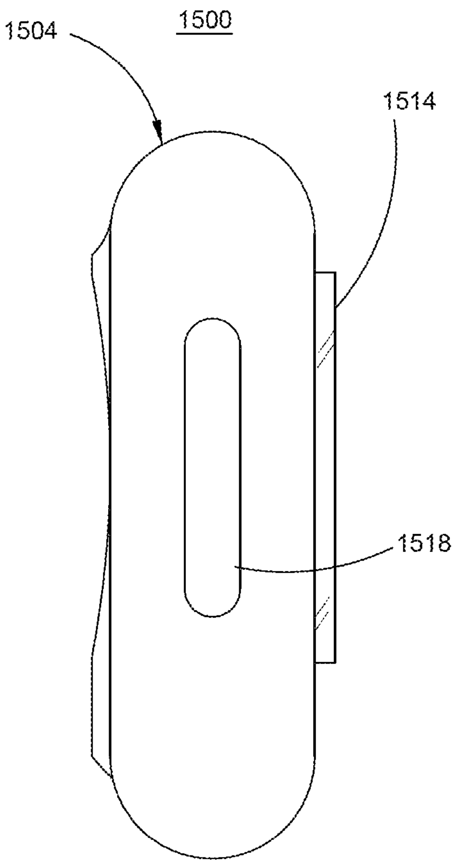
FIGS. 17A and 17B show a left side view of a holder without and with a device for sensing skin contact, in accordance with some embodiments.
Figure 17B:
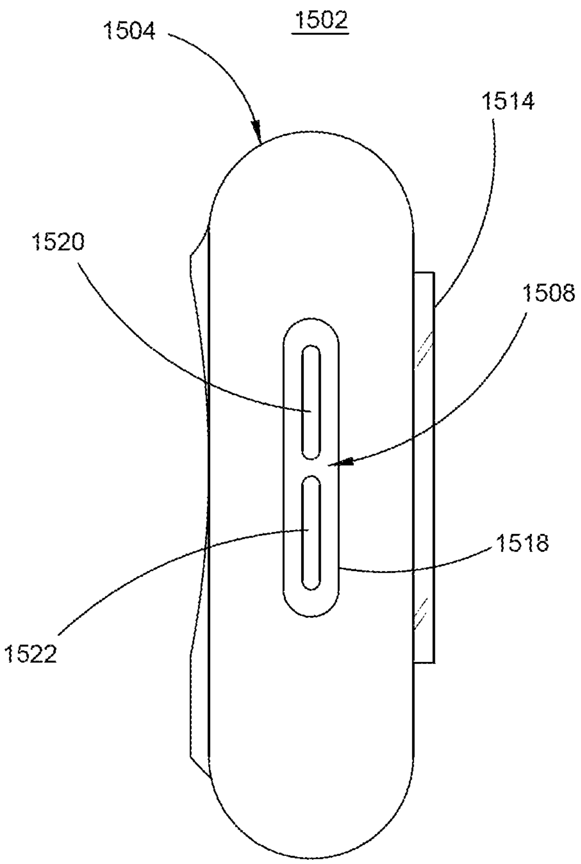
Figure 18A:
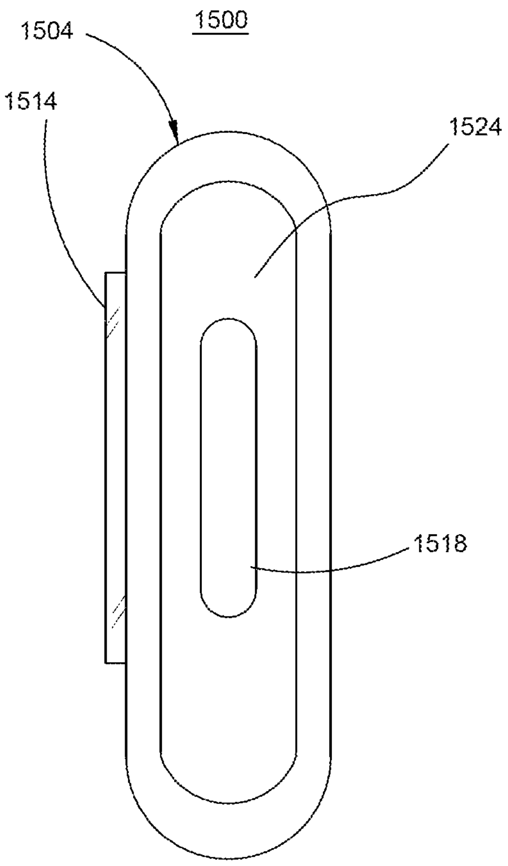
FIGS. 18A and 18B show a right side view of a holder without and with a device for sensing skin contact, in accordance with some embodiments.
Figure 18B:
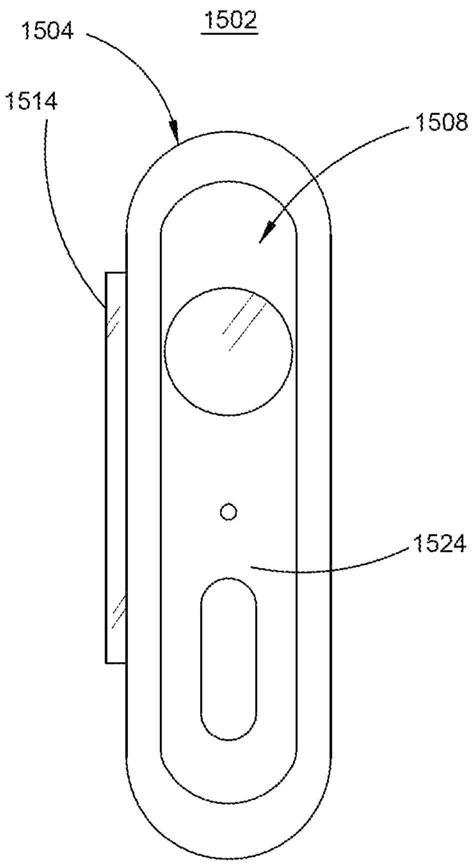
Figure 19:
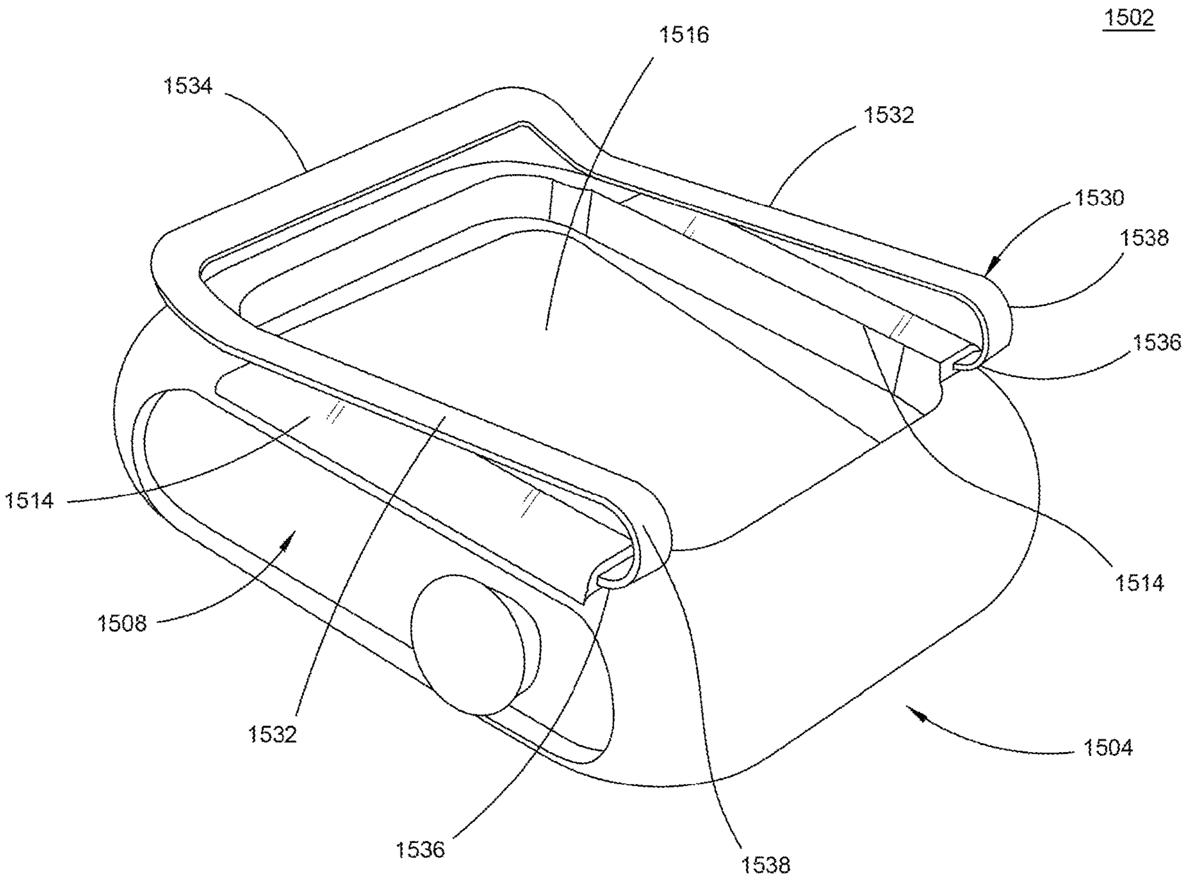
FIG. 19 shows a rear top right side perspective view of a holder with a device for sensing skin contact, in accordance with some embodiments.

At the rear of the holder 1504, as seen in FIGS. 16A-16B, there are clip pockets 1514 on both sides of the rear opening 1512. The rear opening 1512 allows a user to see the face 1516 of the smart-watch device 1508. The clip pockets 1514 are longitudinal pockets along the exterior surface of the holder 1504 that are configured to receive corresponding portions of a clip (as shown in FIG. 19). The portions of the clip can are elongated members that can slide into the clip pockets 1514 so that the clip can be held to the main body of the holder 1504. At the left side of the holder 1504, as shown in FIGS. 17A, 17B, there is an audio port opening 1518. This allows the smart-watch device 1508 to play audio over a small audio transducer through a speaker port 1520, and to also receive sound at a microphone port 1522. At the right side of the holder 1504 is the insertion opening 1524 that allows a user to insert the smart-watch device 1508 into the holder 1504 so that the smart-watch device is retained in the holder 1504, and to also access control features on the side of the smart-watch device 1508 while the smart-watch device 1508 is inside the holder 1504.

FIG. 19 shows a rear top right side perspective view of a holder 1504 with a device 1508 for sensing skin contact inserted therein, in accordance with some embodiments. In this view the clip 1530 is placed into the holder 1504. Specifically, elongated parallel members 1536 of the clip 1530 are inserted into the clip pockets 1514 at the rear of the holder 1504. The members 1536 in the pocket are each connected to a corresponding outside member 1532 that are each likewise elongated members that extend from a spring elbow 1538 that join members 1536 to members 1532. The spring elbows 1538 can bend, such as by the members 1532 being moved away from members 1536, but resist such movement and urge the members 1532, 1536 together. A cross member 1534 can be angled outward in order to facilitate the insertion of a portion of a garment between the members 1532, 1536 to clip the holder 1504 and device 1508 onto the garment. The cross member 1534 joins members 1532 at the end opposite from the spring elbows 1538. Thus, as configured in FIG. 19, the holder can be clipped onto a garment such that the skin sensor 1510 of the smart-watch device 1508 will be in direct contact with the wearer's skin. Once the holder/device are in place, the skin sensing process for security can commence.

Figure 20A:
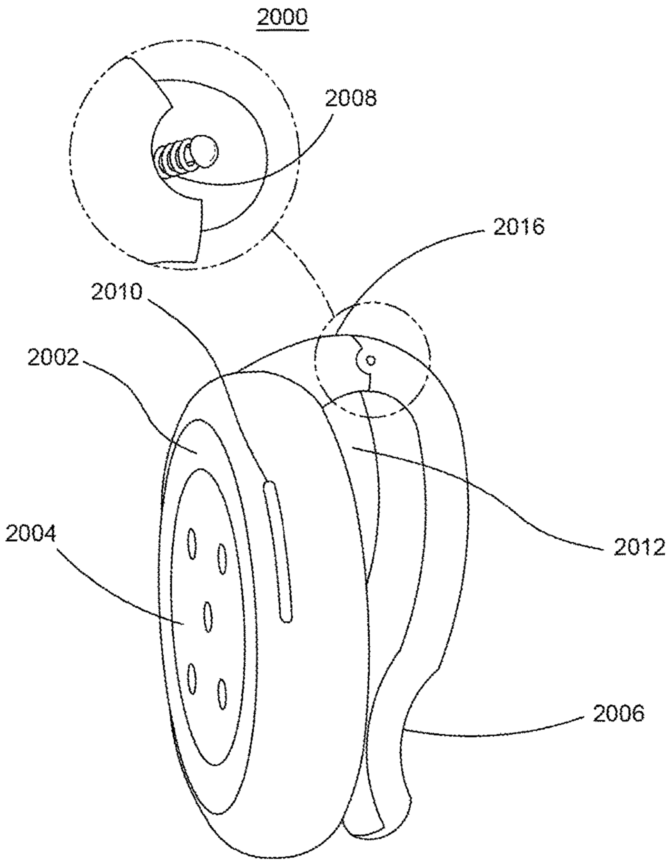
FIGS. 20A and 20B show a side perspective view and a front view, respectively, of a stand-alone security device, in accordance with some embodiments.
Figure 20B:
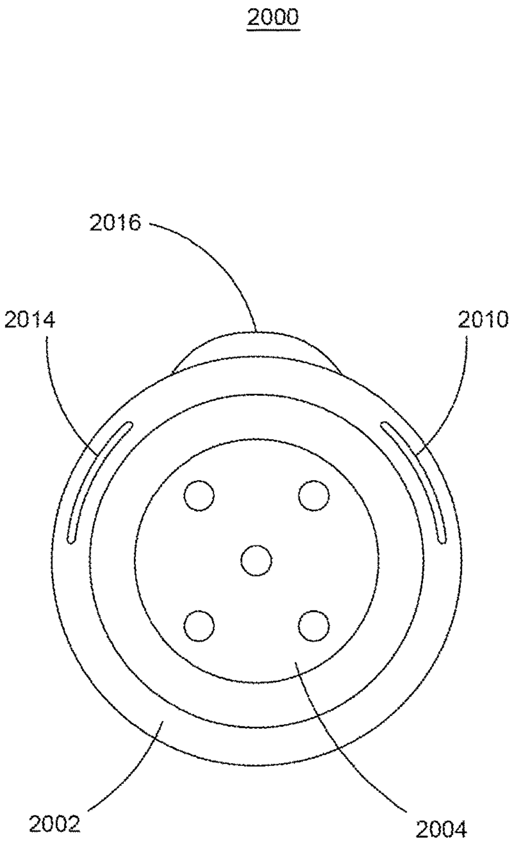

FIGS. 20A and 20B show a side perspective view and a front view, respectively, of a stand-alone security device 2000, in accordance with some embodiments. Internally, the device 2000 can schematically equivalent to that shown in FIG. 13, or an equivalent thereof. Other features of a smart-watch device are not present in this embodiment; thus, there is no watch face display, for example, or controls to operate watch functions. There is a skin sensor 2004 that is intended to be in contact with the wearer's skin, and to detect when contact is lost in order to initiate an alarm process, such as that described in reference to FIGS. 9 and 10. A clip arm 2006 can be connected to the body of the device 2000 at the top 2016 and can be biased towards the front 2002 of the device 2000 by a spring 2008. There can be a gap 2012 between the front portion of the device and the clip arm to accommodate the material of a garment onto which the device 2000 is clipped. There can further be a microphone port 2010 and a speaker port 2014 so that the device can receive and play audio sounds. The microphone at the microphone port 2010 can capture and transmit live audio to the mobile device, which can in turn transmit the live audio to another entity and/or a storage medium. The speaker port 2014 can be used to play, for example, alert or alarm sounds, as well as voice content received from another person, such as may happen during an alarm event. It is also contemplated that a camera may be included on the device 2000 to record and transmit images and video content during an alarming process.

Accordingly, the disclosed embodiments provide a personal security alarm device that clips onto a wearer's garment, and provides a body contact sensor between the garment and the wearer's skin. In the event that contact between the device and the wearer's skin is lost, such as could occur during an attack of the wearer by another person or persons, the device initiates an alarm process. The wearer's location can be transmitted to another party, such as, for example, police, who can respond to the location. The device is also capable or recording media such as audio and video in some embodiments.

The claims appended hereto are meant to cover all modifications and changes within the scope and spirit of the present invention.

What is claimed is:

1. A device for personal security, comprising:

a body having a first side and a second side that is opposite the first side;

a sensor disposed in the body and facing outward at the first side of the body, the sensor being configured to detect a change from first being in contact with a skin of a wearer of the device and then not being in contact with the skin of the wearer for a predetermined length of time, wherein if skin contact has been re-established within the predetermined length of time, monitoring contact with the skin is restarted;

a garment attachment at the second side of the body that is configured to attach the body to a garment such that the body is positioned between the garment and the skin of the wearer of the device; and a radio transceiver disposed in the body that transmits an alarm message when the predetermined length of time is reached.

2. The device of claim 1, wherein the garment attachment comprises a clip that captures a portion of the garment between the clip and the body of the device.

3. The device of claim 1, wherein the garment attachment comprises a portion of a hook and loop material that mates with a corresponding and complementary portion of the hook and loop material disposed on the garment.

4. The device of claim 1, wherein the sensor and the radio transceiver are housed together in a component that is inserted into and retained by the body.

5. The device of claim 4, wherein the component is a smart watch.

6. The device of claim 1, wherein the radio transceiver is a personal area network transceiver, and wherein the alarm message is transmitted to a mobile phone device.

7. The device of claim 1, wherein the radio transceiver is a cellular transceiver, the device further includes a satellite location receiver, and the alarm message includes a location of the device.

8. The device of claim 1, wherein the sensor is configured to sense at least one biometric parameter of the wearer.

9. The device of claim 1, wherein the sensor is configured to sense at least one of a biometric parameter of the wearer, a temperature, or an ambient light level.

10. The device of claim 1, wherein the garment attachment include a magnet.

11. The device of claim 1, further comprising a microphone, and wherein transmitting the alarm message includes transmitting audio information produced by the microphone.

12. A method, comprising:

providing a personal security device including a body having a first side and a second side that is opposite the first side, a sensor disposed in the body and facing outward at the first side of the body, a garment attachment at the second side of the body, and a radio transceiver;

attaching the personal security device using the garment attachment to a garment worn by a wearer and positioning the personal security device between the wearer and the garment such that the sensor is in contact with a skin of the wearer;

the personal security device, via the sensor, monitoring contact with the skin of the wearer;

the personal security device, via the sensor, determining that the sensor has lost contact with the skin of the wearer;

when the contact with the skin of the wearer is re-established within a predetermined time, restarting monitoring contact with the skin of the wearer; and when the contact with the skin of the wearer is not re-established within the predetermined time, transmitting an alarm message via the radio transceiver.

13. The method of claim 12, wherein providing the personal security device with the garment attachment comprises providing the personal security device with a clip at the second side of the body that is configured to clip over an edge of the garment and attaching the personal security device to the garment comprises placing the clip over the garment at the edge of the garment.

14. The method of claim 12, wherein the body is a holder, and wherein the sensor and the radio transceiver are contained together in a component that is held in the holder.

15. The method of claim 12, wherein the sensor is a biometric sensor, determining that the sensor has lost contact with the skin of the wearer comprises determining that the biometric sensor can no longer sense a biometric parameter of the wearer.

16. The method of claim 12, wherein the sensor is a light sensor, determining that the sensor has lost contact with the skin of the wearer comprises determining that the light sensor is detecting an increase in a light level.

17. The method of claim 12, wherein transmitting the alarm message via the radio transceiver comprises transmitting the alarm message to a mobile phone device to which the personal security device is wirelessly linked via the radio transceiver.

18. The method of claim 12, wherein transmitting the alarm message via the radio transceiver comprises transmitting the alarm message to a server via a cellular infrastructure.

19. The method of claim 12, wherein the personal security device is further provided with a satellite location receiver, transmitting the alarm message comprises transmitting a location of the personal security device as indicated by the satellite location receiver.

20. The method of claim 12, wherein the personal security device is further provided with a microphone, transmitting the alarm message comprises transmitting an audio signal received at the microphone.

* * * * *